Nov. 27, 1962  E. C. JACKSON  3,065,492
DEVICE FOR COATING AND UNCURLING A PHOTOGRAPHIC PRINT
Filed June 25, 1959  2 Sheets-Sheet 1

Edmund C. Jackson,
INVENTOR.

BY.

Neel B. Hammond

AGENT.

Nov. 27, 1962 E. C. JACKSON 3,065,492
DEVICE FOR COATING AND UNCURLING A PHOTOGRAPHIC PRINT
Filed June 25, 1959 2 Sheets-Sheet 2

Edmund C. Jackson,
INVENTOR.

BY.

Noel B. Hammond

AGENT.

# United States Patent Office 3,065,492
Patented Nov. 27, 1962

3,065,492
DEVICE FOR COATING AND UNCURLING
A PHOTOGRAPHIC PRINT
Edmund C. Jackson, 226 Via Pasqual, Hollywood Riviera,
Redondo Beach, Calif.
Filed June 25, 1959, Ser. No. 822,883
2 Claims. (Cl. 15—506)

The present invention relates to equipment for use with cameras, and more particularly, to a device for facilitating the uncurling of a photographic print and the application of a protective coating thereto after the print is developed in a self-developing camera.

When using a camera of the type which develops and prints a finished photograph in the camera immediately after exposure of the film, it is necessary to coat the photographic print with a preservative substance which makes the image permanent and protects the print from damage. It is important that the print be coated immediately after it is developed to prevent deterioration of the image, particularly under humid conditions. In addition, it is desirable that the curl of the photographic print be removed so that it will lay flat.

Such cameras may be used at any location, either indoors or outdoors and, frequently, the prints are developed at a location in which it is inconvenient to uncurl the print and apply the protective coating. If one is out of doors, where no facilities are available, it is necessary to locate a straight-edge over which to draw the print several times to remove the curl; to locate a clean, flat surface on which to place the print while applying the coating; and to find a safe repository for the camera while the print is being treated.

The usual procedure is to hold the camera between the knees, draw the print over one edge of the camera-well access door with both hands until it is reasonably flat, and then to hold the print against the flat rear surface of the camera with one hand while applying the preservative coating with the other hand. This process is awkward and inconvenient and, in addition, subjects the rear surface of the camera to the residue of the preservative substance. If the process is performed indoors, care must be taken that the preservative substance which is used to coat the print is not permitted to damage household furnishings.

Accordingly, it is an object of the present invention to provide a device which facilitates the uncurling of a photographic print and the application of a protective coating thereto.

Another object of the invention is the provision of a device with which a photographic print may be uncurled and coated with a preservative substance simultaneously.

Yet another object of the present invention is to provide a device with which a photographic print may be uncurled and coated with a preservative substance in a convenient manner.

A further object of the invention is the provision of a device for use in uncurling a photographic print and applying a protective coating thereto, which is simple, inexpensive and easy to manufacture.

In accordance with these and other objects of the invention, a device is provided which may be easily attached to a self-developing camera and which makes readily available everything necessary for the uncurling and coating of a photographic print. The device does not interfere with the normal operation of the camera in any way, and by its use a print may be simultaneously uncurled and coated with one hand while holding the camera with the other hand.

According to one embodiment of the present invention, the device attaches to the camera without modification thereof by means of a projection which fits beneath one end of the carrying strap already provided on the camera and a mounting screw which threads into the tripod mounting hole, also already provided on the camera. The mounting screw may be easily turned with a coin so that the device may be readily attached to and removed from the camera, as desired without having to use a special tool. The device embodying the present invention is formed in a manner such that it does not interfere with the placement of the camera, in the space provided for it in the camera carrying case with the device fastened in place. Furthermore, the head of the mounting screw which secures the device to the camera is drilled and tapped to the exact thread size and depth as the original tripod mounting hole in the camera so that a tripod may be used even when the device is fastened to the camera.

In accordance with the invention, the device includes a straight-edge and means for exerting tension on a photographic print arranged such that the print may be easily uncurled by drawing it over the straight-edge several times with one hand. In addition, the device includes means for holding a wiper which is supplied with the film and which is impregnated with a preservative substance. The wiper is arranged such that the print is coated with the preservative substance at the same time the curl is being removed.

A replaceable cartridge containing a number of disposable sheets of paper, waxed on one side, is provided to dispose of any residue of the coating substance and also to be used as a lens cleaning tissue. A cover prevents evaporation of the coating material from the wiper when the device is not being used. A pointed tool or pick is fastened to the device by a cord or a fine diameter wire from a spring-loaded reel, the pick being for the purpose of assisting in the removal of the photographic print from the camera after it is developed and before it is uncurled and coated.

The following specification and the accompanying drawing describe and illustrate exemplifications of the present invention. Consideration of the specification and the drawing will lead to an understanding of the invention, including the novel features and objects thereof. Like reference characters are used to designate like parts throughout the figures of the drawing.

Figure 1:
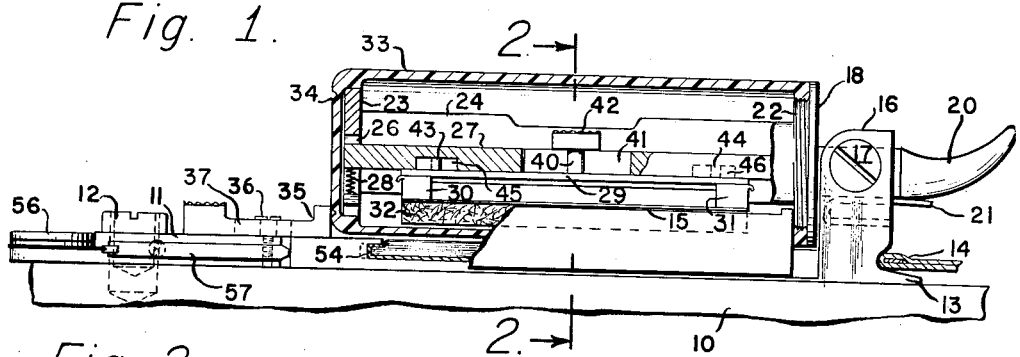
FIG. 1 is a view, partly in section and partly broken away, of an embodiment of a device in accordance with the present invention.

Referring now to FIG. 1 of the drawing, an exemplary embodiment of a device in accordance with the invention for uncurling and coating a photographic print is shown fastened to a camera, indicated at 10. A longitudinal base member 11 is fastened to the camera 10 by means of a captive screw 12 which threads into the tripod mounting hole provided in the camera 10. The screw 12 is provided with a slot of such dimensions that it may be readily turned with a coin, and the head of the screw 12 is drilled and tapped so that a tripod may be used even when the base member 11 is fastened to the camera 10. At the other end of the base member 11, a projection 13 is provided which slips beneath one end of the camera carrying strap 14 so that the device is firmly secured to the camera 10.

Figure 2:
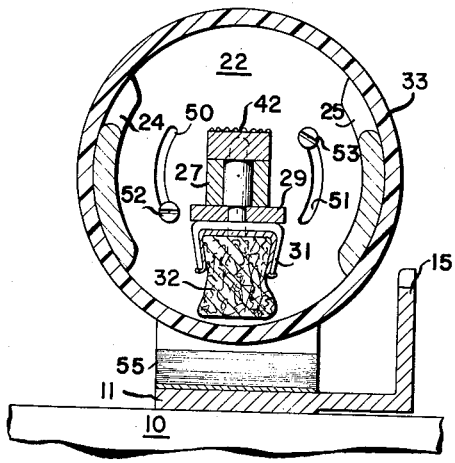
FIG. 2 is a sectional view of the device of FIG. 1, taken along line 2—2 of FIG. 1.

A portion of the base member 11 adjacent the projection 13 extend outwardly and upwardly to form a straight-edge 15, best seen in FIG. 2. The straight-edge 15 is slightly 29 longer than the width of the photographic print to be treated 30 and is slightly cut away in the center so that when a print is drawn over the straight-edge 15, it will be guided and thus will not slip off either end. The other end of the base member 11 adjacent the mounting screw 12 is made no thicker than necessary so that the camera 10 may be placed in a carrying case (not shown) with the device secured in place.

Pivot arms 16 extend upwardly from the end of the base member 11 adjacent to the projection 13, and through which a pivot screw 17 passes. A wiper support 18 is pivotally mounted on the pivot screw 17 and extends along the base member 11 parallel to the straight-edge 15. One end of the wiper support 18 extends above the projection 13 of the base member 11 and forms an operating lever 20. A flat spring 21 fastened to the base member 11 and in contact with the lower side of the operating lever 20 urges the wiper support 18 toward the base member 11 so that it normally extends parallel to, and immediately above, the base member 11.

Figure 3:
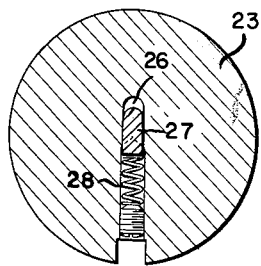
FIG. 3 is a sectional view of one element of the device of FIG. 1.

The wiper support 18 is provided with two circular end members 22 and 23 which are joined together by longitudinal side members 24 and 25 so that the portion of the wiper support 18 adjacent the straight-edge 15 resembles a hollow spool. The end members 22 and 23 are each provided with a slot 26 in which is disposed the ends of a wiper carrier 27. This feature is best seen in FIG. 3. A coil spring is provided in each of the end members 22 and 23 to urge the wiper carrier 27 away from the base member 11. To the wiper carrier 27 is slidably fastened a holder 29 provided with a pair of spring clips 30 and 31, one at each end.

The holder 29 is free to move in a direction parallel with the base member 11. This is accomplished by means of a pin 40 which extends upwardly from the holder 29 through a slot 41 in the wiper carrier 27. The pin 40 is provided with an enlarged head 42 which serves as an operating button when the device is in use. The side members 24 and 25 are relieved adjacent to the operating button 42 to provide access thereto. The motion of the holder 29 is limited to longitudinal motion with respect to the wiper carrier 27 by guide pins 43 and 44 extending upwardly from the holder 29 and disposed in correspond in slots 45 and 46 in the wiper carrier 27.

A wiper 32, which is made of cotton or other absorbent material and is impregnated with a preservative substance, is supplied with the film for the self-developing camera 10. The wiper 32 is clipped into the spring clips 30 and 31 so that it extends immediately above the base member 11 and parallel with the straight-edge 15. By depressing the operating button 42, the wiper 32 may be brought into forcible contact with a photographic print placed between the base member 11 and the wiper support 18. The wiper 32 may be moved longitudinally by sliding the operating button 42 with respect to the wiper carrier 27. Thus the wiper 32 is enabled to contact the entire surface of a photographic print from edge to edge.

To prevent evaporation of the preservative substance when the device is not in use, a cover 33 is provided which completely encloses the wiper support 18 and screws onto the end member 22 closest to the pivot screw 17. The outside surface of the opposite end of the cover 33 is provided with a circular groove 34 which a locking member 35 engages to prevent the cover 33 from loosening. The locking member 35 slides longitudinally along the base member 11 by means of a screw 36 passing through a slot 37 in the locking member 35. When the cover 33 is removed from the wiper support 18, the locking member 35 slides into engagement with the end member 23 of the wiper support 18 to provide firm support therefor.

To facilitate the insertion and removal of the wiper 32 from the spring clips 30 and 31, the end members 22 and 23 and the side members 24 and 25, that is, the portion of the wiper support 18 resembling a hollow spool, are rotatable as a unit with respect to the remainder of the wiper support 18. Referring to FIG. 2, semi-circular slots 50 and 51 provided in the end member 22 in conjunction with associated pins or screws 52 and 53 permit 90 degree rotation of the portion of the wiper support 18 resembling a hollow spool.

Immediately below the wiper 32, the base member 11 is provided with a grooved depression 54 in which is placed a cartridge or packet containing a number of sheets of disposable paper 55. When a residue of the preservative substance accumulates on the uppermost sheet of the paper 55, it may be removed and thrown away. This prevents the back of the photographic print from becoming soiled with the preservative substance while it is being treated. The bottom surface of the sheets of disposable paper 55 is coated with wax to prevent moisture transmission to the unused sheets of the paper 55. Also, the paper sheets may be used as lens cleaning tissues.

A spring-loaded reel 56 is provided at the end of the base member 11 adjacent the mounting screw 12. A cord wound on the reel 56 has its free end fastened to a tool 57 having a sharp, flat point which is used to facilitate removal of the photographic print from the camera after it has been developed and before it is uncurled and coated.

Figure 4:
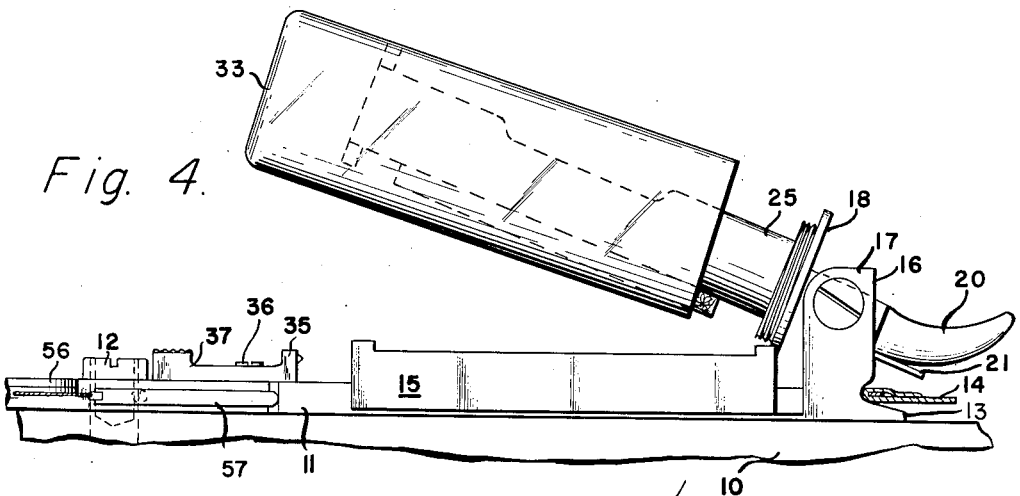
FIG. 4 illustrates the device of FIG. 1 being prepared for use.
Figure 6:
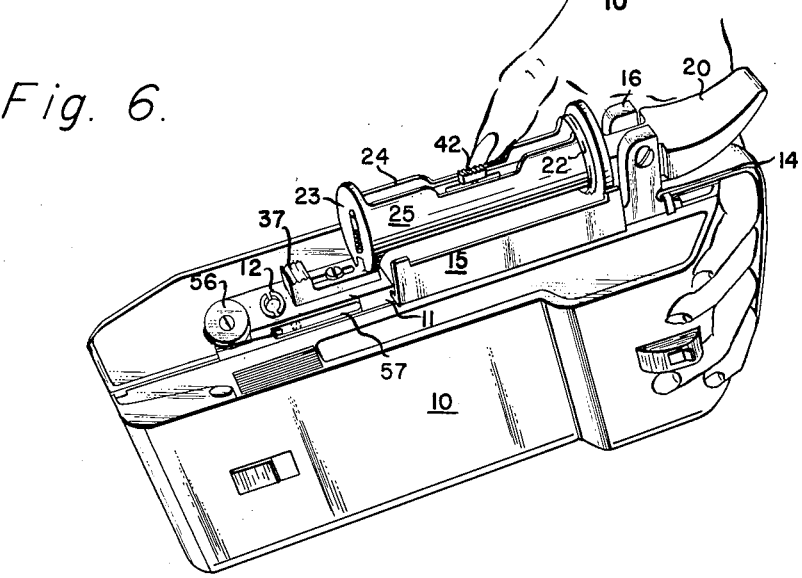
FIG. 6 illustrates the manner of operating the device of FIG. 1 while holding the camera in one hand.
Figure 5:
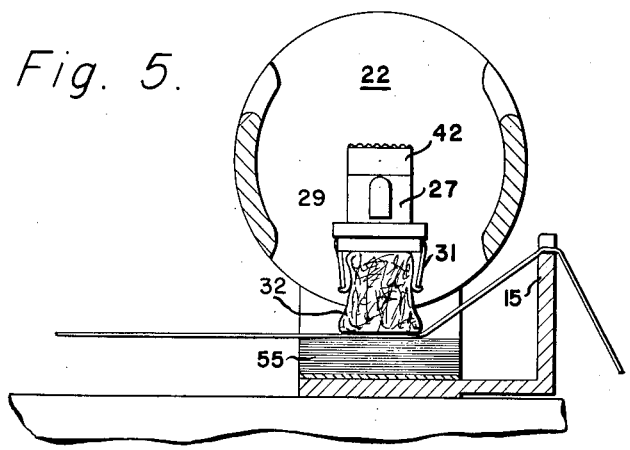
FIG. 5 illustrates the operation of the device of FIG. 1.

Referring now to FIGS. 4, 5 and 6, in operation the camera 10 is held with one hand, the fingers being under the carrying strap 14 and the thumb being adjacent the device of the present invention. The locking member 35 is moved away from the wiper support 18 to disengage it from the circular groove 34 in the cover 33. The operating lever 20 is depressed and the cover 33 is unscrewed and removed. The locking member 35 is then moved toward the wiper support 18 to engage the end member 23 as the operating lever 20 is released.

The print is removed from the camera 10 with the aid of the tool 57 as the cord is unreeled from the spring-loaded reel 56. The operating lever 20 is again depressed and the photographic print is placed between the wiper support 18 and the base member 11. The operating lever 20 is then released. The operating button 42 is then depressed and moved longitudinally as the photographic print is pulled between the wiper 32 and the packet of papers 55 and over the straight-edge 15.

Figure 7:
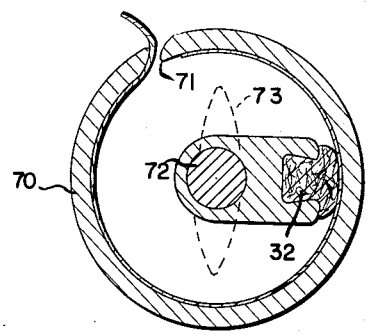
FIG. 7 illustrates another embodiment of a device according to the present invention.

Referring to FIG. 7, there is shown another embodiment of a device in accordance with the present invention. A cylindrical chamber 70 is provided with a slot 71 along one side thereof. The wiper 32 is mounted on a rotatable and slidable shaft 72 which is operated by an external knob 73. The print is inserted in the chamber 70 so that it encircles the inner wall thereof, and the handle 73 is operated to rotate and slide the wiper 32 until the print is completely coated with the preservative substance. The print is then withdrawn from the chamber 70 such that it is drawn over the edge of the slot 71 to remove the curl.

Thus, there has been described a device which facilitates the simultaneous coating and uncurling of a photographic print in a convenient manner, and which is simple, inexpensive and easy to manufacture.

What is claimed is:

1. Apparatus for use with a self-developing camera for applying a preservative coating to a photographic print and for removing the curl therein, said apparatus comprising: a longitudinal base member adapted to extend along one side of a self-developing camera, said base member having a captive screw at one end thereof adapted to threadably engage a tripod mounting hole provided in said camera, said screw being provided with a slot of such dimensions that it may be readily turned with a coin, the head of said screw having a threaded hole therein adapted to threadably engage a camera tripod, the other end of said base member being provided with a projection adapted to extend beneath one end of a carrying strap provided on said camera, said base member having a projection extending lengthwise thereof and having a relatively sharp edge for uncurling photographic prints drawn thereover, a pair of pivot arms extending outwardly from said base member adjacent one end thereof, a longitudinal support member pivotally mounted near one end to said pivot arms, a spring fastened to said base member at said pivot arms and in contact with said support member, said spring urging said support member to normally extend above and parallel to said base member, said support member having a longitudinal slot extending parallel to said base member, a wiper holder movably secured to said support member by a pin extending through the slot therein, said wiper holder being longitudinally slideable along said support member and above said base member, said wiper holder having at least one spring clip adapted to engage a wiper impregnated with a preservative substance, and a cover adapted to enclose said wiper holder and to threadably engage said support member adjacent said pivot arms when said apparatus is not in use.

2. Apparatus for use with a self-developing camera for applying a preservative coating to a photographic print and for removing the curl therein, said apparatus comprising: a longitudinal base member to extend along one side of a self-developing camera, said base member having a screw hole at one end thereof to register with a tripod mounting hole provided in said camera, the other end of said base member being provided with a projection to extend beneath one end of a carrying strap provided on said camera, said base member having a projection extending lengthwise thereof and having a relatively sharp edge for uncurling photographic prints drawn thereover, a pair of pivot arms extending outwardly from said base member adjacent one end thereof, a longitudinal support member pivotally mounted near one end to said pivot arms, a spring fastened to said base member at said pivot arms and in contact with said support member, said spring urging said support member to normally extend above and substantially parallel to said base member, said support member having a slot substantially parallel to said base member, and a wiper holder movably secured to said support member by a pin extending through the slot therein, said wiper holder being longitudinally slideable along said support member and above said base member, said wiper holder having spring clip means to engage a wiper impregnated with a preservative substance.

References Cited in the file of this patent
UNITED STATES PATENTS

| | | |
|---|---|---|
| 2,740,374 | Booth et al. | Apr. 3, 1956 |
| 2,800,846 | Farley | July 20, 1957 |
| 2,908,025 | Ashby | Oct. 13, 1959 |
| 2,950,664 | Stolier | Aug. 30, 1960 |